US009976476B2

(12) United States Patent
Hettinger et al.

(10) Patent No.: US 9,976,476 B2
(45) Date of Patent: May 22, 2018

(54) TURBOCHARGER BEARING ASSEMBLY

(71) Applicant: Honeywell International Inc., Morristown, NJ (US)

(72) Inventors: Raphaël Hettinger, La Baffe (FR); Raphaël Boileau, Thaon les Vosges (FR); Fréderic Daguin, Epinal (FR)

(73) Assignee: Honeywell International Inc., Morris Plains, NJ (US)

( * ) Notice: Subject to any disclaimer, the term of this patent is extended or adjusted under 35 U.S.C. 154(b) by 420 days.

(21) Appl. No.: 14/684,395

(22) Filed: Apr. 12, 2015

(65) Prior Publication Data
US 2016/0298535 A1 Oct. 13, 2016

(51) Int. Cl.
*F02B 39/14* (2006.01)
*F01D 25/16* (2006.01)
(Continued)

(52) U.S. Cl.
CPC ............ *F02B 39/14* (2013.01); *F01D 25/164* (2013.01); *F01D 25/166* (2013.01); *F01D 25/18* (2013.01); *F16C 25/083* (2013.01); *F16C 27/045* (2013.01); *F05D 2220/40* (2013.01); *F05D 2240/53* (2013.01); *F05D 2240/54* (2013.01);
(Continued)

(58) Field of Classification Search
CPC ...... F04B 35/002; F16C 25/08; F16C 25/083; F01D 25/16; F01D 25/164; F04D 13/04
See application file for complete search history.

(56) References Cited

U.S. PATENT DOCUMENTS 3,017,230 A 1/1962 Meermans
3,637,271 A 1/1972 Bayard
(Continued)

FOREIGN PATENT DOCUMENTS

CN 201771556 U 3/2011
EP 2530254 A2 12/2012
(Continued)

OTHER PUBLICATIONS

PCT/US2016/026880 International Search Report, dated Jul. 19, 2016 (4 pages).
(Continued)

*Primary Examiner* — Woody Lee, Jr.
*Assistant Examiner* — Maxime Adjagbe
(74) *Attorney, Agent, or Firm* — Brian J. Pangrle

(57) ABSTRACT

An assembly can include a turbocharger center housing that includes a through bore and a counterbore positioned between a compressor end and a turbine end of the through bore where the through bore includes a sleeve mating surface positioned between the compressor end and the counterbore and a turbine side bearing lubricant film formation surface positioned between the counterbore and the turbine end; and a sleeve positioned at least in part in the through bore of the turbocharger center housing between the compressor end and the counterbore where the sleeve includes a locating flange and an axial extension that extends from the locating flange where the axial extension includes an outer mating surface, an inner compressor side bearing lubricant film formation surface, a compressor side axially facing spacer surface and a turbine side axially facing spacer surface.

15 Claims, 14 Drawing Sheets

(51) Int. Cl.
  *F01D 25/18* (2006.01)
  *F16C 25/08* (2006.01)
  *F16C 27/04* (2006.01)
  *F16C 35/077* (2006.01)
  *F16C 19/54* (2006.01)

(52) U.S. Cl.
  CPC .......... *F16C 19/548* (2013.01); *F16C 35/077* (2013.01); *F16C 2360/24* (2013.01)

(56) References Cited

U.S. PATENT DOCUMENTS

| | | | |
|---|---|---|---|
| 4,285,632 | A | 8/1981 | Desalve |
| 4,565,505 | A | 1/1986 | Woollenweber |
| 4,652,219 | A | 3/1987 | McEachern, Jr. et al. |
| 4,721,441 | A | 1/1988 | Mayashita et al. |
| 4,808,091 | A * | 2/1989 | Ruetz .................... F01D 25/16 384/556 |
| 4,943,170 | A | 7/1990 | Aida |
| 4,983,050 | A | 1/1991 | Aida |
| 4,997,290 | A | 3/1991 | Aida |
| 5,522,667 | A | 6/1996 | Miyake |
| 5,622,358 | A | 4/1997 | Komura |
| 5,639,074 | A | 6/1997 | Greenhill et al. |
| 6,971,801 | B2 | 12/2005 | Miyazaki et al. |
| 7,214,037 | B2 | 5/2007 | Mavrosakis |
| 8,985,857 | B2 | 3/2015 | Schmidt et al. |
| 2007/0036477 | A1 | 2/2007 | McKeirnan, Jr. |
| 2007/0154126 | A1 | 7/2007 | Ito |
| 2007/0183704 | A1 | 8/2007 | Umekawa |
| 2007/0280824 | A1 | 12/2007 | Ward |
| 2008/0019629 | A1 | 1/2008 | McKeiman |
| 2009/0202343 | A1 | 8/2009 | McKeiman |
| 2011/0200422 | A1 | 8/2011 | Gutknecht |
| 2011/0274379 | A1* | 11/2011 | Fiedler ................ F01D 25/164 384/91 |
| 2012/0282078 | A1 | 11/2012 | Marsal et al. |
| 2012/0308366 | A1* | 12/2012 | Petitjean ................ F01D 25/16 415/170.1 |
| 2013/0294948 | A1 | 11/2013 | Schumnig |
| 2014/0119898 | A1 | 5/2014 | Nishida |
| 2014/0369865 | A1 | 12/2014 | Marsal |

FOREIGN PATENT DOCUMENTS

| | | |
|---|---|---|
| JP | H06-001737 U | 1/1994 |
| JP | 2002129967 A | 5/2002 |
| JP | 2002129968 A | 5/2002 |
| JP | 2002129969 A | 5/2002 |
| JP | 2002242937 A | 8/2002 |
| JP | 2005171796 A | 6/2005 |
| JP | 2005172099 A | 6/2005 |
| JP | 2006090402 A | 4/2006 |
| JP | 2009204004 | 9/2009 |
| JP | 2009-293614 A | 12/2009 |
| JP | 2010151293 A | 7/2010 |
| WO | 20020006649 A1 | 1/2002 |
| WO | 2005057032 A1 | 6/2005 |
| WO | 2005073575 A1 | 8/2005 |
| WO | 2014014791 A1 | 1/2014 |

OTHER PUBLICATIONS

PCT/US2016/026880 Written Opinion, dated Jul. 19, 2016 (9 pages).
PCT/US2016/026872 International Search Report, dated Jul. 22, 2016 (4 pages).
PCT/US2016/026872 Written Opinion, dated Jul. 19, 2016 (10 pages).
EP Application No. 16 163 758.2, Examination Report & Search Report, dated Aug. 23, 2016 (6 pages).
PCT International Search Report / Written Opinion, PCT/US2014/041001, dated Oct. 7, 2014 (11 pages).

* cited by examiner

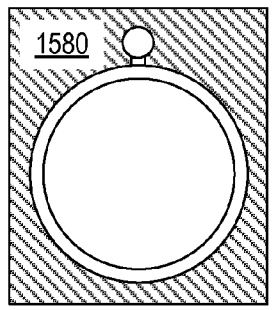
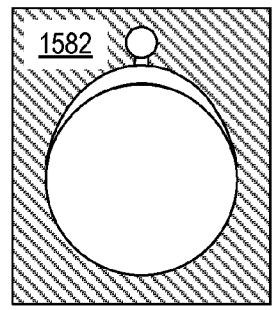
Fig. 12A    Fig. 12B
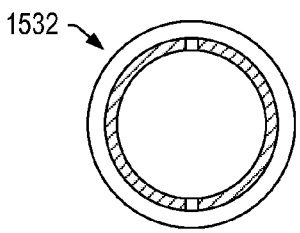
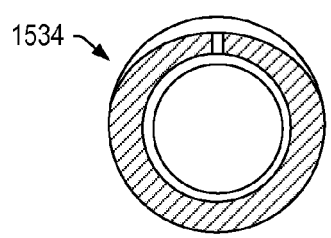
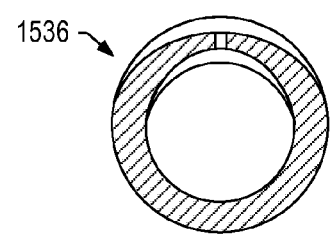
Fig. 12C    Fig. 12D    Fig. 12E
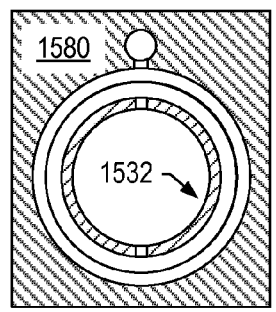
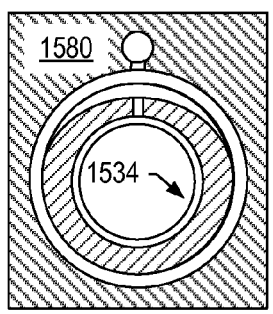
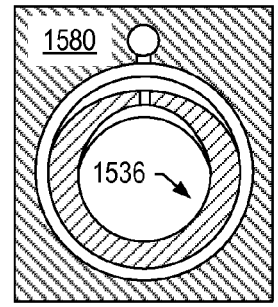
Fig. 12F    Fig. 12G    Fig. 12H
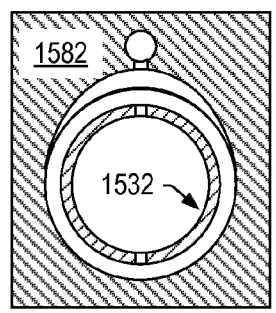
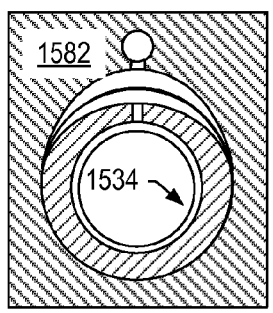
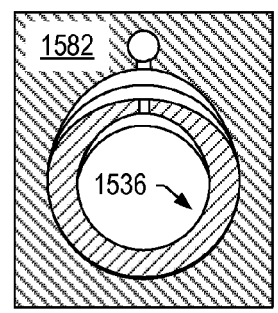
Fig. 12I    Fig. 12J    Fig. 12K

TURBOCHARGER BEARING ASSEMBLY

TECHNICAL FIELD

Subject matter disclosed herein relates generally to turbochargers.

BACKGROUND

A turbocharger can increase output of an internal combustion engine. A turbocharger can include an exhaust turbine assembly that can receive exhaust gas from cylinders of an internal combustion engine. Exhaust may be directed to a turbine wheel such that energy may be extracted, for example, to drive a compressor wheel of a compressor assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIGS. 12A, 12B, 12C, 12D, 12E, 12F, 12G, 12H, 12I, 12J and 12K show various cross-sectional views of housings and sleeves and housing and sleeve assemblies;

DETAILED DESCRIPTION

Figure 1:
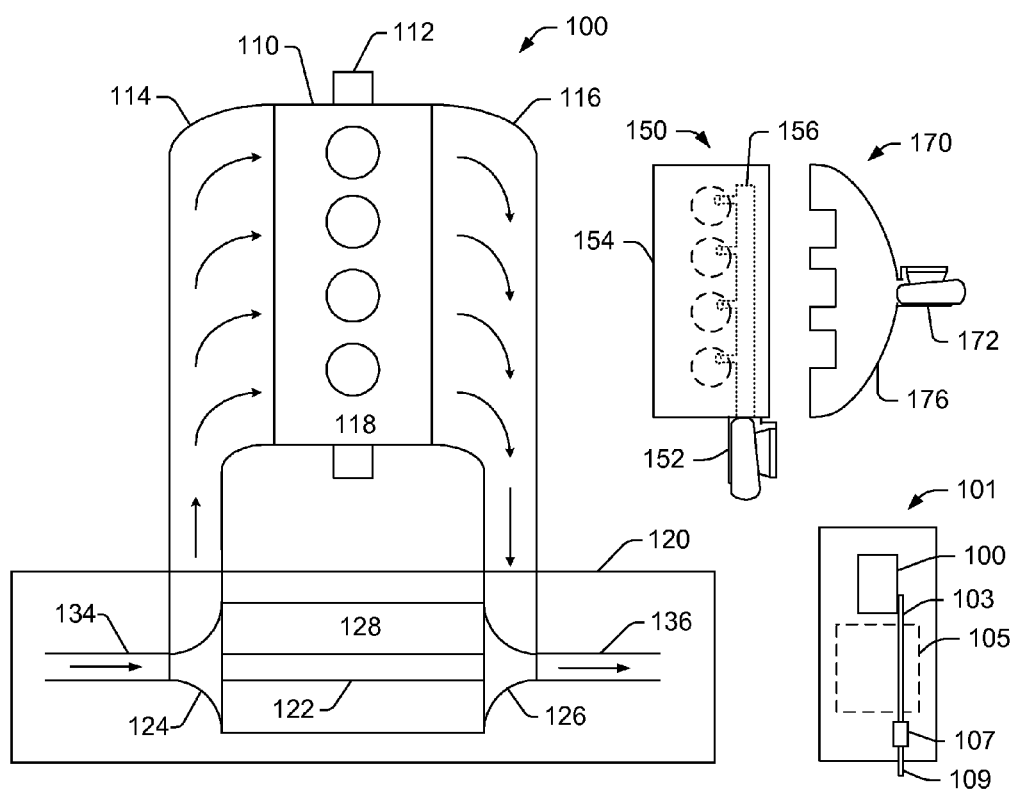
FIG. 1 is a diagram of an example of a turbocharger and an internal combustion engine along with a controller.
Figure 1:
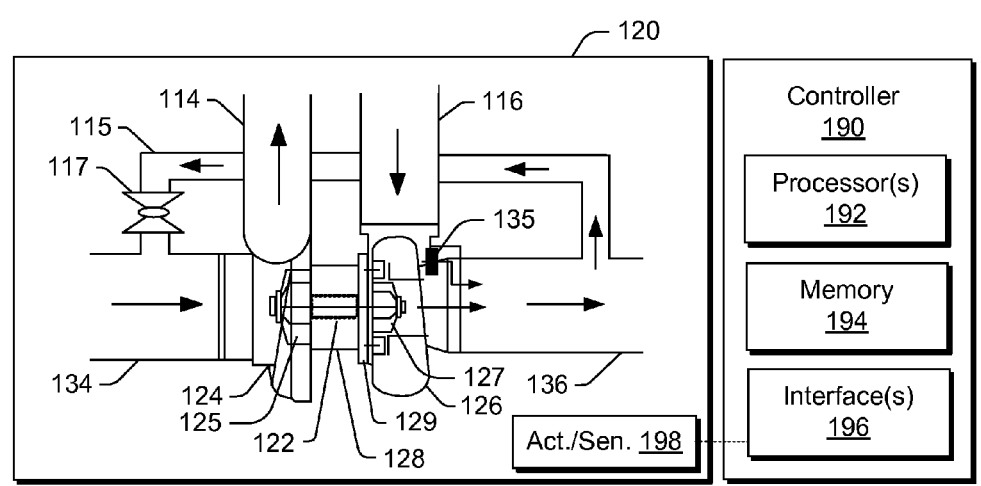

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Exhaust driven turbochargers can include a rotating shaft carrying a turbine wheel and a compressor wheel where the shaft is typically rotatably supported within a center housing (e.g., intermediate a compressor and a turbine) by one or more lubricated bearings (e.g., oil lubricated). During operation, exhaust from an internal combustion engine drives a turbocharger's turbine wheel, which, in turn, drives the compressor wheel to boost charge air to the internal combustion engine.

During operation, a turbocharger's rotating assembly may reach rotational speeds in excess of 100,000 rpm (e.g., some may reach rotational speeds of 250,000 rpm or more). To handle such high speeds, a turbocharger's center housing rotating assembly (CHRA) requires balance and adequate lubrication. Factors such as noise, vibration and harshness (NVH), as well as efficiency, are often interrelated and must be within acceptable limits. As an example of interrelatedness, vibration can generate noise and reduce efficiency. Further, under dynamic conditions, such as an increase in exhaust flow, axial thrust forces can cause contact between various CHRA components. Contact can cause wear, which, in turn, can alter balance, leading to increased noise, vibration, etc., and reduced efficiency. Certain types of contact and wear may lead to failure of one or more components.

Turbocharger bearing systems may offer both support and damping to control motion of a turbocharger shaft, for example, to help isolate vibrations from rotating parts while allowing the turbocharger shaft to spin, for example, at speeds that may be about 60 times faster than a maximum engine speed (e.g., consider a diesel engine). A turbocharger bearing system may help ensure turbocharger operational efficiency by keeping frictional losses and NVH low such that energy from the engine exhaust gas is available to drive the turbocharger. Where operational conditions may vary, a turbocharger bearing system may be selected to help balance low-power losses with an ability to control forces applied by varying mechanical loading (e.g., thrust and other forces).

As to turbocharger bearing system hydrodynamics, fluid (e.g., oil or other lubricant) may lubricate components and also influence motion of a turbocharger shaft. As an example, a "fully-floating" bearing system can include a journal bearing that supports a shaft using an outer film disposed between a bore wall of a center housing and an outer surface of the journal bearing and an inner film disposed between an inner surface of the journal bearing and an outer surface of the shaft. In such an example, the journal bearing may rotate (azimuthally) at approximately one-half the speed of the shaft and move axially and radially (i.e., the journal bearing is fully-floating).

As to a "semi-floating" approach, an anti-rotation mechanism may act limit rotation (azimuthally) of a journal bearing or, for example, an outer race of a rolling element bearing (REB). As an example, a semi-floating journal bearing or a semi-floating REB may support a shaft using, in part, an outer oil film disposed between an outer surface of the journal bearing or an outer surface of the REB and a bore wall of a center housing where the outer oil film acts as a "squeeze film", for example, to damp undesirably shaft motions.

As an example, a turbocharger may include one or more rolling element bearings (REBs), which may be, for example, one or more ball bearing assemblies. As an example, a turbocharger may include one or more journal bearings (e.g., with an inner journal surface and an outer surface). As an example, a turbocharger may include at least one REB and at least one journal bearing.

As an example, an REB can include an outer race, an inner race and rolling elements disposed between the inner and outer races (e.g., in a raceway or raceways). For example, consider an REB that includes a unitary outer race and a two-piece inner race fit to a turbocharger shaft (e.g., a shaft and wheel assembly (SWA) where rolling elements allow for rotation of the shaft and two-piece inner race with respect to the outer race). In such an example, the outer race of the REB may be "located" in a bore of a housing such as a center housing (e.g., disposed between a compressor housing and a turbine housing).

As an example, to axially locate an outer race with respect to a center housing, a turbocharger assembly may include locating mechanism. As an example, a locating mechanism may include one or more key-keyway pairs where a key received by a keyway acts to restrict, for example, azimuthal rotation of an outer race about an axis. Such an anti-rotation mechanism may provide for a "semi-floating" arrangement, for example, where an outer race has an ability to move in a radial direction and where radial clearances between an outer surface of the outer race and a bore surface of a center housing or a sleeve provide for squeeze film formation (e.g., one or more lubricant films).

As an example, a turbocharger bearing assembly can include a spacer configured to space two turbocharger bearings. As an example, a spacer may be part of a sleeve, for example, a sleeve with a spacer portion along its axial length. As an example, a spacer or spacer portion of a sleeve may be configured as an annular body that defines a central through bore and that includes an axial end face and an opposing axial end face. In such an example, the spacer or spacer portion of a sleeve may include a diameter (e.g., or radii) that may optionally provide for an interference fit with respect to a wall or walls of a bore of a housing. For example, a spacer or a sleeve with a spacer portion may be interference-fit into a bore of a housing to be retained in the bore of the housing with a static force sufficient to axially locate one or more bearing assemblies. As an example, a sleeve may include a flange that includes features that allow the sleeve to be operatively coupled and located with respect to a center housing. In such examples, the spacer or the spacer portion of the sleeve may space and, at least in part, axially locate a compressor side bearing and a turbine side bearing, which may be, for example, rolling element bearings (REBs) (e.g., ball bearing assemblies) or, for example, a compressor side REB and a turbine side journal bearing.

As an example, a through bore of a housing may include a counterbore that includes an axially facing surface. For example, a through bore may include a sleeve portion that can receive at least a portion of a sleeve that can locate a compressor side bearing and the through bore may include a turbine side bearing portion that can receive at least a portion of a turbine side bearing. In such an example, a counterbore may define a boundary where, to a compressor side, a larger bore exists to receive a sleeve and where, to a turbine side, a smaller bore exists to receive a turbine bearing. As an example, a counterbore may be formed by machining a housing with a through bore from a compressor side to create an enlarged bore that can receive at least a portion of a sleeve where the sleeve can receive at least a portion of a compressor side bearing. In such an example, the sleeve may include a spacer portion that can act to axially locate the compressor side bearing and to axially locate a turbine side bearing.

As an example, a spacer portion of a sleeve may include a spring or springs, for example, where such a spring or springs may act to damp axial thrust forces, enhance balanceability (e.g., of a CHRA), etc. As an example, a spring may be provided as a biasing unit or biasing mechanism, for example, with an end cap at each end of the spring. Such a unit or mechanism may be configured to simultaneously contact, via its end caps, a compressor side bearing and a turbine side bearing. For example, such a unit or mechanism may contact, via a first end cap, an outer race of a compressor side REB and may contact, via a second end cap, an outer race of a turbine side REB.

As an example, a method can include interference-fitting a sleeve into a bore of a housing (e.g., by contacting a housing mating surface and a sleeve mating surface), inserting a shaft with a first rolling element bearing fitted thereto into the bore where the shaft extends axially through the sleeve and inserting a second rolling element bearing into the bore while fitting it to the shaft and locating it at least partially within the sleeve. As an example, a housing may be a turbocharger center housing, a shaft may be a shaft and wheel assembly (SWA), a first rolling element bearing may be a turbine side REB and a second rolling element bearing may be a compressor side REB. A method may further include operating a turbocharger while axially locating, via a spacer portion of a sleeve, a turbine side REB and a compressor side REB where the spacer portion of the sleeve is disposed axially between the two REBs by having been fit into a bore of a housing of the turbocharger. In such an example, the spacer portion of the sleeve may provide for contacting an outer race of the turbine side REB and for contacting an outer race of the compressor side REB.

As an example, a spring may be disposed in a central through bore of a spacer portion of a sleeve and located via end caps in which the spring is seated. For example, a wave spring may have an uncompressed length that exceeds a length of a spacer portion of a sleeve such that the wave spring can load one or more bearings disposed adjacent to the spacer portion of the sleeve (e.g., via contact formed by end caps in which the wave spring is seated). As an example, squeeze films of an outer race of a turbine side REB and an outer race of a compressor side REB (e.g., with respect to respective clearances with a housing bore wall and a sleeve wall) may, in combination with a spring disposed between end caps that are located in a bore of a spacer portion of a sleeve, enhance performance of a turbocharger (e.g., a turbocharger CHRA). As an example, performance may be enhanced by a spring, for example, as to balanceability. As an example, one or more squeeze films may help to enhance performance, for example, by damping vibrations, etc. that may occur during operation of a turbocharger. As an example, an outer race of one or more bearings may be fully-floating or semi-floating.

As an example, an end cap may include one or more lubricant wells located at an axial end face. For example, a first end cap may include an annular compressor end well and a second end cap may include an annular turbine end well. Such features may act as thrust pads with respect to outer races. As an example, formation of one or more lubricant films may occur between an end cap and a bearing. With increased damping provided by lubricant films and spring loading, certain vibrations may be diminished in dynamic imbalance measurements, which may allow for improved assembly balancing (e.g., to reduce NVH). As an example, lubricant between an end cap and an outer race may reduce friction and, for example, act to decrease wear between parts.

Figure 2:
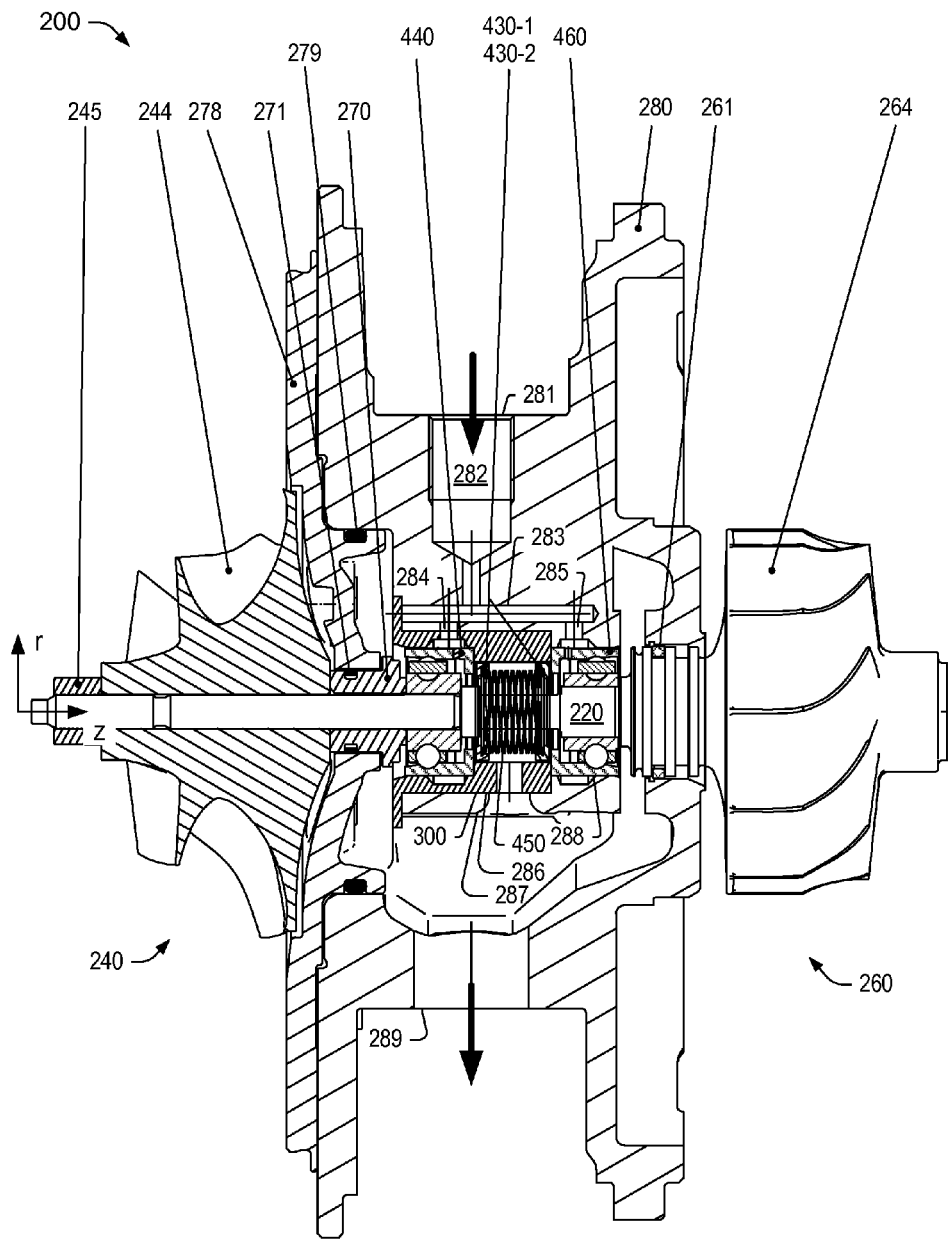
FIG. 2 shows a cutaway view of an example of a turbocharger assembly.

FIG. 2 shows an example of a turbocharger assembly 200. As shown, the turbocharger assembly 200 can include a rotatable shaft 220 supported by a compressor side bearing 440 disposed at least in part in a sleeve 300 that is disposed at least in part in a housing 280 and a turbine side bearing 460 disposed at least in part in the housing 280 where the bearings 440 and 460 are axially located between a compressor end 240 and a turbine end 260 of the turbocharger assembly 200. As shown, a compressor wheel 244 may be fit to the shaft 220 and secured via a nut 245 while a turbine wheel 264 may be an integral portion of the shaft 220, for example, via welding (e.g., to form a shaft and turbine wheel assembly or "SWA"). As an example, one or more seal rings 261 may be disposed in grooves of a portion of the shaft 220, for example, to form a seal with a bore of the housing 280 (e.g., a seal to hinder outward flow of lubricant and inward flow of exhaust). In the example of FIG. 2, the assembly 200 also includes a collar 270 disposed in a bore of a compressor plate 278 and about a portion of the shaft 220. As an example, the collar 270 may include a seal ring 271 (e.g., or more than one seal ring, etc.) and the compressor plate 278 may include a seal ring 279 that may form a seal with the housing 280. Such features may hinder flow of lubricant and air between a compressor space and a housing space.

In the example of FIG. 2, the housing 280 includes a lubricant inlet 281 and a lubricant outlet 289. As indicated by arrows, lubricant may flow from the inlet 281 to the outlet 289 via a bore 282 that directs lubricant to various lubricant passages with openings along a first axial bore portion 286 of the housing 280 (e.g., a sleeve bore portion) and a second axial bore portion 288 of the housing 280 (e.g., a turbine side bearing portion). For example, the housing 280 includes an axially extending lubricant passage 283 that is in fluid communication with a radially extending compressor side bearing lubricant passage 284 and a radially extending turbine side bearing lubricant passage 285. The lubricant outlet 289 can collect lubricant that flows through or around the components in various bore portions of the housing 280. As an example, a clearance between components may form a passage for flow of lubricant. In such an example, a clearance may be defined with respect to a cylindrical coordinate system (e.g., r, z, and Θ). As an example, a clearance may extend azimuthally about another component, for example, 360 degrees (e.g., consider a full annular passage) or, for example, less than 360 degrees (e.g., consider a passage that is a part of an annulus). As an example, lubricant may flow via the lubricant output 289 to then be cooled, filtered, etc., and, for example, eventually recirculated to the inlet 281 (e.g., via a lubricant pump of an internal combustion engine). To assist with flow of lubricant, the inlet 281 and the outlet 289 may be aligned with gravity. As an example, in a non-operational state, a rotating assembly may rest in the bore portions 286 and 288 at least in part along a lower bore wall surface (e.g., due to gravity). Upon commencement of an operational state, the rotating assembly may lift off one or more surfaces, for example, at least in part due to lubricant flow, lubricant film formation, etc.

As shown in the example of FIG. 2, the turbocharger assembly 200 includes the sleeve 300, a compressor side REB 440, a spring 450 and a turbine side REB 460. As mentioned, during operation, thrust forces may be generated and transmitted along an axial direction, as represented by a z-axis. Such forces may be directed toward the compressor end or toward the turbine end of the turbocharger assembly 200. As an example, the spring 450 may apply preload to the REBs 440 and 460, which may optionally assist with damping axial vibration. As an example, a spring may create a substantially constant force on a compressor side bearing to help stabilize a CHRA. As an example, a spring may be a biasing mechanism; accordingly, an assembly may include a sleeve with a spacer portion and a biasing mechanism. As an example, a spring may be part of a subassembly that may form in part, for example, a spring and sleeve assembly (e.g., as a subassembly of a turbocharger assembly). As an example, a sleeve may be interference fit (e.g., press fit, etc.). As an example, a sleeve may be maintained in a position via an interference fit. As an example, a sleeve may be maintained in a position via one or more of an interference fit and a mechanism that includes, for example, a pin, a bolt, etc. As an example, a sleeve may be maintained in a position (e.g., or at least in part restricted in movement) via a mechanism that includes, for example, a pin, a bolt, etc.

Figures 3A, 3B:
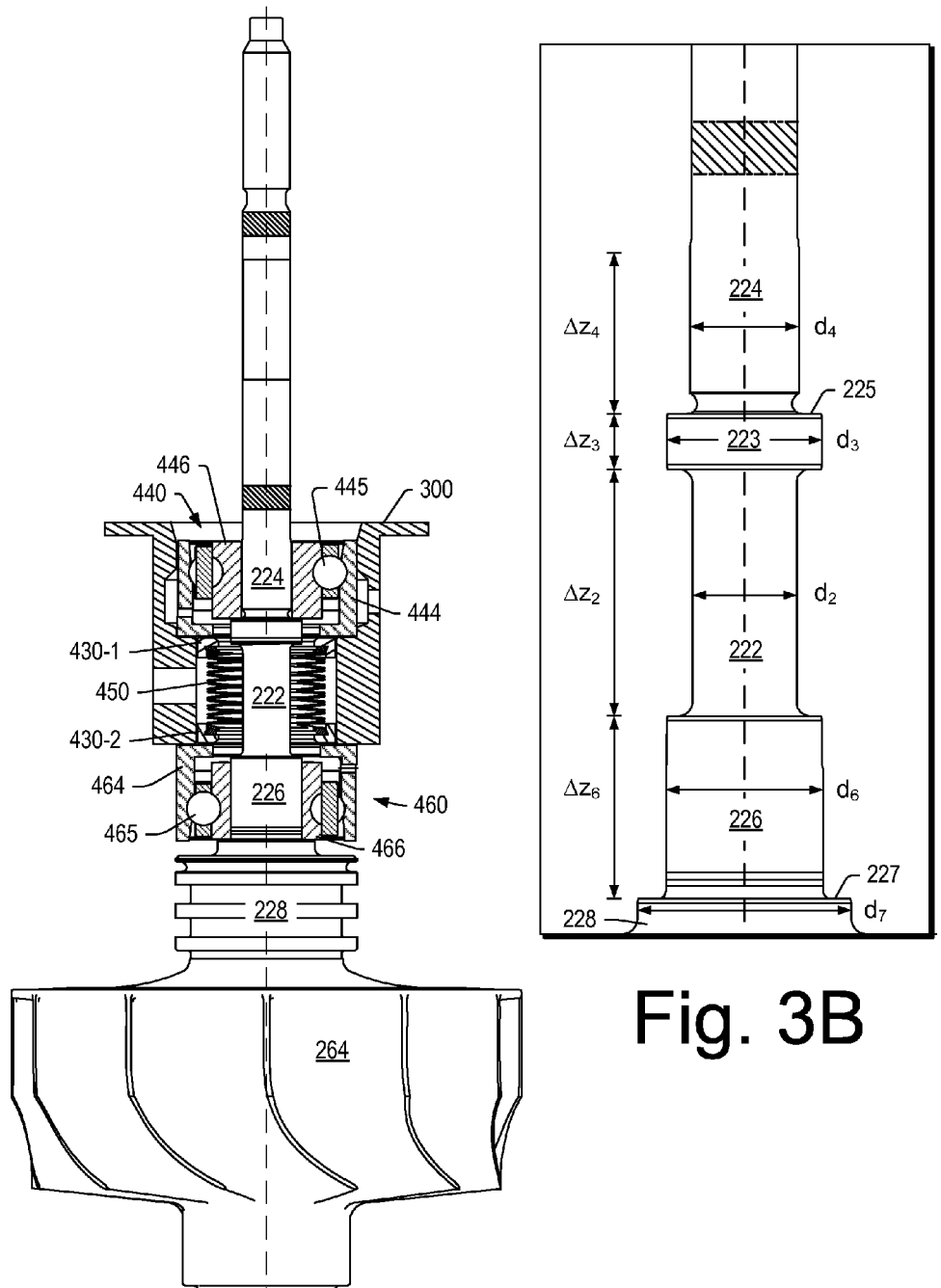
FIGS. 3A and 3B shows a cutaway view of a portion of the turbocharger assembly of FIG. 2 and a portion of a shaft, respectively.

FIGS. 3A and 3B shows a cutaway view of a portion of the turbocharger assembly 200 of FIG. 2 and a portion of the shaft 220, respectively. In particular, FIG. 3A shows the shaft 220 as including an intermediate portion 222 disposed between a compressor portion 224 and a turbine portion 226 where the turbine portion extends to a hub portion 228 with at least one annular groove, which extends to the turbine wheel 264. As shown, the turbine side bearing 460 may be a rolling element bearing that includes an outer race 464, rolling elements 465 and an inner race 466 that is fit to the turbine portion 226 of the shaft 220. As shown, the compressor side bearing 440 is a rolling element bearing that includes an outer race 444, rolling elements 445 and an inner race 446 that is fit to the compressor portion 224 of the shaft 220.

In the example of FIG. 3A, the sleeve 300 receives the compressor side bearing 440 as well as the spring 450, which is disposed between end caps 430-1 and 430-2. As shown, the spring 450 may apply biasing force to the outer race 444 and the outer race 464. Further, the sleeve 300 may act to at least in part axially locate the outer race 444 and the outer race 464.

In FIG. 3B, the shaft 220 is shown along with various axial dimensions and radial dimensions. For example, the portion 226 may be of an axial length of approximately $\Delta z_6$ and of a diameter of approximately $d_6$; the portion 222 may be of an axial length of approximately $\Delta z_2$ and of a diameter of approximately $d_2$; a portion 223 may be of an axial length of approximately $\Delta z_3$ and of a diameter of approximately $d_3$; and the portion 224 may be of an axial length of approximately $\Delta z_4$ and of a diameter of approximately $d_4$.

Also shown in FIG. 3B are an axial facing surface 225 of the portion 223 and an axial facing surface 227 of the portion 228. As an example, the shaft 220 may include a neck between the axial facing surface 225 and the diameter $d_4$ of the portion 224 and the shaft 220 may include a radius (e.g., an annular radiused surface) between the axial facing surface 227 and the diameter 226 of the portion 226. As an example, the axial facing surface 225 may be an annular surface with an inner diameter of about $d_4$ and an outer diameter of about $d_3$. As an example, the axial facing surface 227 may be an annular surface with an inner diameter of about $d_6$ or slightly larger (e.g., due to a radius) and an outer diameter of about $d_7$.

As an example, the axial facing surface 225 may be an axial stop surface for a compressor side bearing. For example, the inner race 446 may be positioned axially to contact the axial facing surface 225 (e.g., and hence locate the outer race 444).

As an example, the axial facing surface 227 may be an axial stop surface for a turbine side bearing. For example, the inner race 466 may be positioned axially to contact the axial facing surface 227 (e.g., and hence locate the outer race 464).

As an example, the diameter $d_3$ may be less than the diameter $d_6$. In such an example, a bearing may be passed axially over the portion 223 of the shaft 220 and be positioned with respect to the portion 226 of the shaft 220 (e.g., optionally to be located by the axial facing surface 227). For example, the inner race 466 may include an inner diameter that is larger than the diameter $d_3$ of the portion 223 and that can be interference fit (e.g., press fit) with respect to the diameter $d_6$ of the portion 226. In such an example, the bearing may be a turbine side bearing. As an example, a compressor side bearing may include an inner diameter that is less than that of a turbine side bearing. For example, the inner diameter of the inner race 446 may be less than the inner diameter of the inner race 466. In such an example, the inner race 446 may be too small to pass axially over the portion 223 of the shaft 220 and it may be, for example, axially located by the axial facing surface 225 of the shaft 220.

As shown in the example of FIG. 3B, the shaft 220 includes the portion 222, which can include a diameter $d_2$ that is less than the diameter $d_6$ and, for example, less than the diameter $d_3$ and optionally less than the diameter $d_4$. The portion 222 may be referred to as a slender, for example, in that it is thinner than the portion 226. As an example, the portion 222 may act to reduce global shaft stiffness (e.g., as to rotordynamics). As an example, the portion 222 may act to reduce shaft bending natural frequency. As an example, the portion 222 may act to reduce transmisibility load while allowing for more shaft deformation. In such an example, less energy may be directed outside of the bearing/shaft assembly (e.g., such that less vibration transmitted).

As an example, a radiused surface may be included between the portion 226 and the portion 228 of the shaft 220. In such an example, the radiused surface may act to reduce stress concentration between the portions 226 and 228. As an example, the shaft 220 may include one or more other radiused surfaces. For example, the portion 222 may include at least one radiused surface (e.g., with respect to the portions 223 and/or 226).

As an example, the portion 222 may include the diameter $d_2$ where that diameter differs from the diameter $d_4$ of the portion 224. For example, the portion 222 may be dimensioned with respect to rotordynamics (e.g., natural frequencies, etc.) while the portion 224 may be dimensioned with respect to an impeller bore diameter (e.g., consider a diameter of about 4 mm, etc.).

Figure 4:
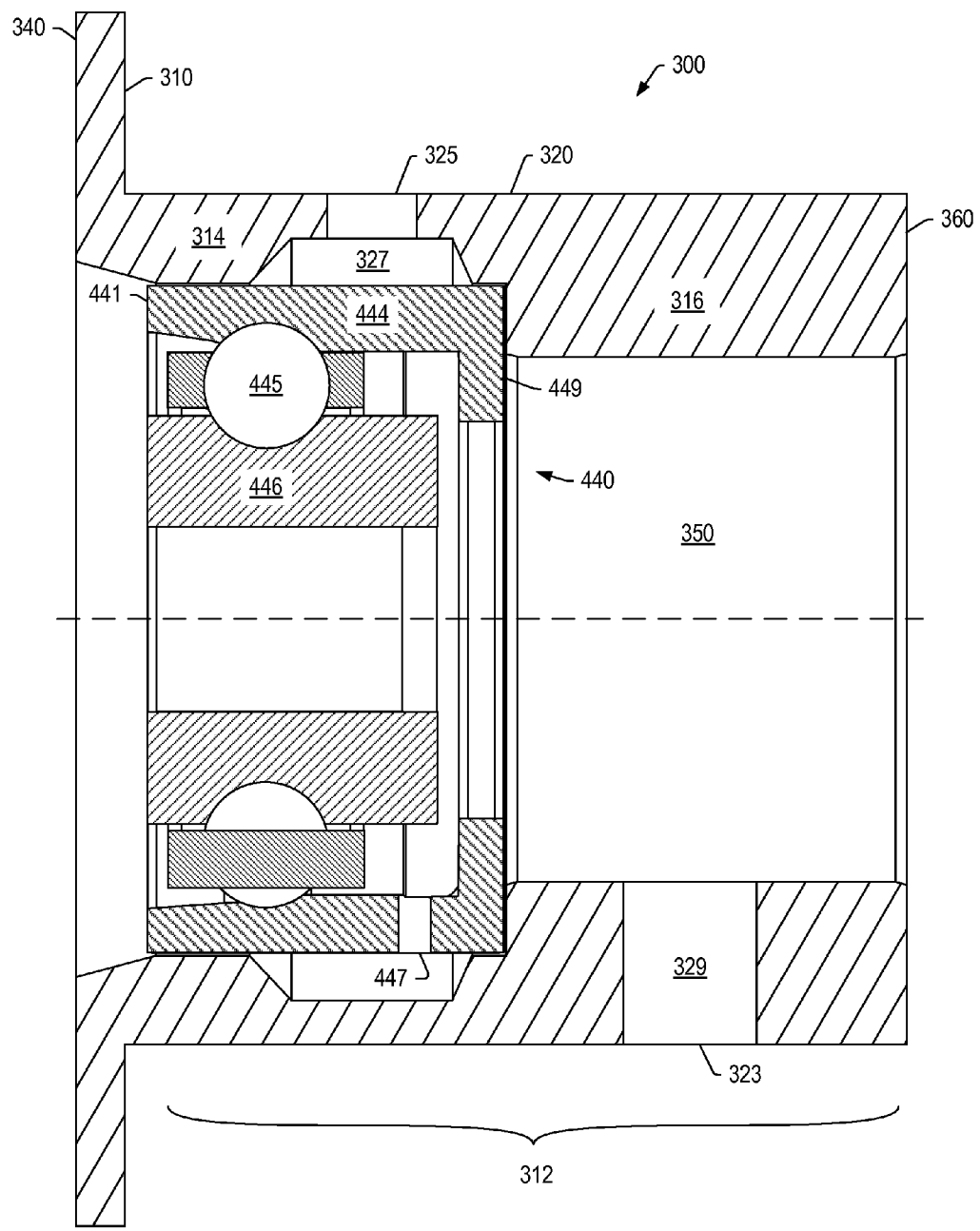
FIG. 4 shows an enlarged view of a portion of the turbocharger assembly of FIG. 3A.

FIG. 4 shows a cutaway view of the sleeve 300 of FIG. 3A along with the compressor side bearing 440 of FIG. 3A. As shown, the sleeve 300 can include a flange 310 and an axial extension 312 that extends axially away from the flange 310. As shown, the axial extension 312 can include a bearing portion 314 and a spacer portion 316. In the example of FIG. 3A, the axial extension 312 includes an outer surface 320 with a lubricant outlet 323 that is in fluid communication with a lubricant port 329 and a lubricant inlet 325 that is in fluid communication with a lubricant well 327. The sleeve 300 also includes a compressor side axially facing surface 340, a bore surface 350 and a turbine side axially facing surface 360.

As to the compressor side bearing 440, as shown in FIG. 4, the outer race 444 can include an axially facing compressor side surface 441, a lubricant port 447 and an axially facing spacer side surface 449. As an example, lubricant may pass through the lubricant inlet 325 of the sleeve 300 to the lubricant well 327 and then via the lubricant port 447 (e.g., or a plurality of such ports) to the rolling elements 445. As an example, a clearance or clearances may exist between the axially facing spacer side surface 449 of the outer race 444 and an axially facing surface of the spacer portion 316 of the sleeve 300 where such a clearance or clearances may provide for passage of lubricant. For example, the outer race 444 may be located via contact between the inner race 446 and the portion 223 of the shaft 220 (e.g., at the surface 225). In such an example, a clearance may exist between the surface 449 of the outer race 444 and a surface of the sleeve 300. As an example, one or more grooves may exist in a component or components that can define one or more clearances through which lubricant may flow.

Figure 5:
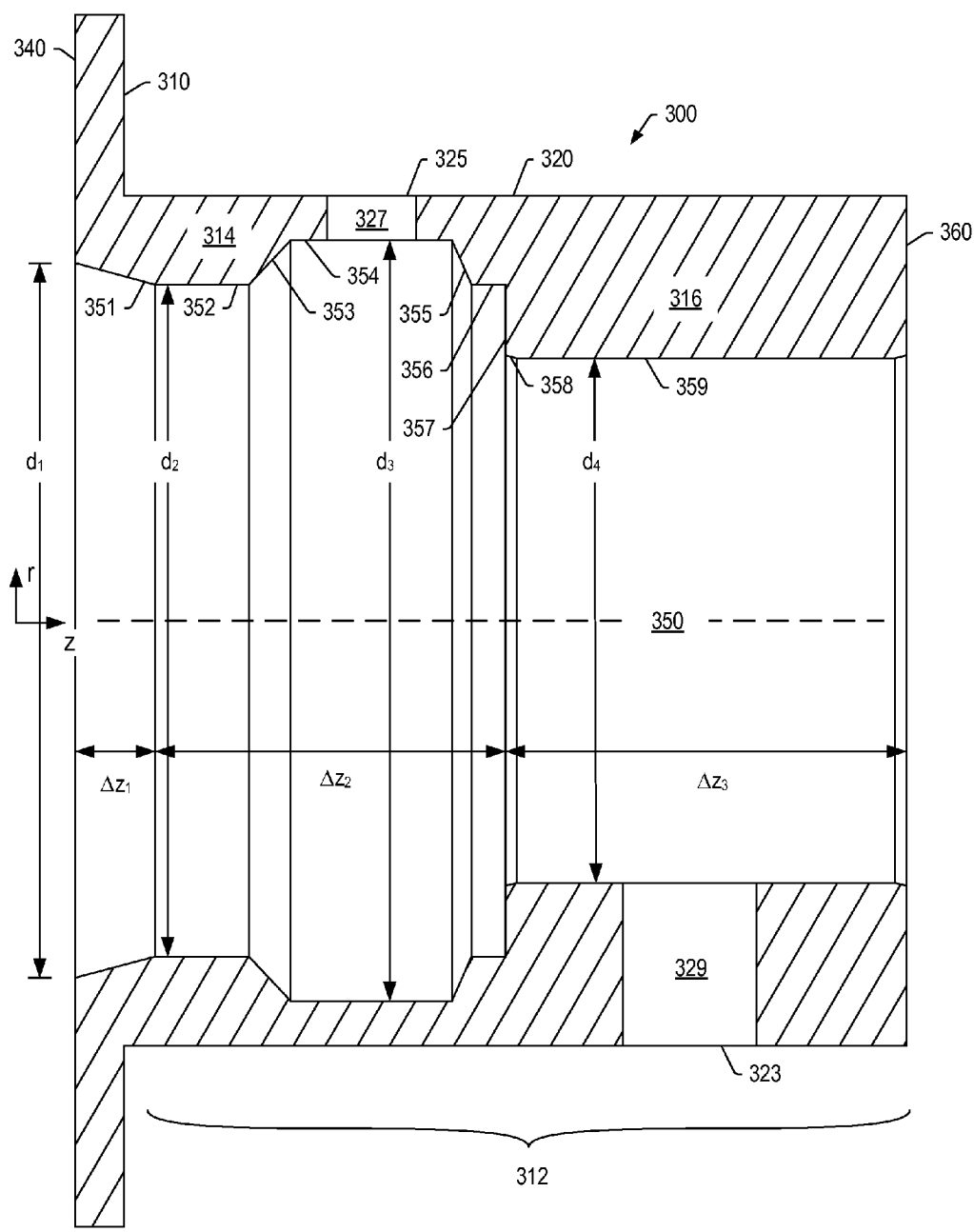
FIG. 5 shows a cutaway view of an example of a sleeve for a turbocharger assembly.

FIG. 5 shows a cutaway view of the sleeve 300 of FIG. 4 where the sleeve 300 can include, for example, a first beveled surface 351, a first lubricant film formation surface 352, a first well surface 353, a second well surface 354, a third well surface 355, a second lubricant film formation surface 356, an axially facing surface 357, a second beveled surface 358 and a spacer portion surface 359. Various dimensions are shown in FIG. 5 including diameters $d_1$, $d_2$, $d_3$ and $d_4$ and axial lengths $\Delta z_1$, $\Delta z_2$ and $\Delta z_3$. In the example of FIG. 5, the lubricant film formation surfaces 352 and 356 are disposed at the diameter $d_2$, which exceeds an outer surface diameter of an outer race to thereby define clearances in which lubricant films may form. As shown, the well surface 354 is disposed at a diameter $d_3$, which exceeds the diameter $d_2$, for example, to define an annular lubricant flow channel with respect to an outer surface of an outer race.

Referring to FIGS. 4 and 5, the axially facing surface 357 of the sleeve 300 may act at least in part to axially locate the outer race 444 of the compressor side bearing 440. For example, the axially facing spacer side surface 449 of the outer race 444 may contact the axially facing surface 357 of the sleeve 300 such that the axially facing surface 357 acts as an axial stop. As an example, the axially facing spacer side surface 449 of the outer race 444 may also extend radially inwardly from an edge of the axially facing surface 357 such that, for example, a spring may directly or indirectly apply a biasing force thereto. During operation of a turbocharger, depending on one or more factors such as magnitude of axial thrust force, spring constant, minimum spring length, etc., the outer race 444 may or may not physically, directly contact the axially facing surface 357. As an example, a lubricant film may form and exist between the axially facing surfaces 357 and 449.

As an example, the port 447 of the outer race 444 may be at least in part axially offset from the lubricant inlet 325 of the sleeve 300, which may act to hinder channeling, which may occur where the port 447 and the lubricant inlet 325 may otherwise align. As an example, the outer race 444 may be free to rotate azimuthally about its axis responsive to rotation of the inner race 446. Where rotation of the outer race 444 occurs in a sympathetic manner, the rotational speed may be less than that of the inner race 446 (e.g., as fixed to the shaft 220). Rotation of the outer race 444 may be supported by lubricant films at the outer surfaces of the outer race 444. For example, a first film may exist with respect to the surface 352 of the sleeve 300, a second film may exist with respect to the surface 356 of the sleeve 300 and a third film may exist with respect to the surface 357 of the sleeve 300. Further, the lubricant well 327 may act as a source of lubricant (e.g., a lubricant chamber) through which lubricant may flow to form one or more squeeze films that may act to damp or hinder particular motions of the outer race 444. For example, a squeeze film may be formed to a compressor side of the lubricant well 327 (e.g., a fore squeeze film) and a squeeze film may be formed to a turbine side of the lubricant well 327 (e.g., an aft squeeze film). As an example, where the lubricant well 327 does not fully encircle the outer race 444 (e.g., a well with an azimuthal span less than 360 degrees), a clearance may exist between the sleeve 300 and the outer race 444 that acts to "bridge" a fore squeeze film and an aft squeeze film.

As an example, during operation, the outer race 444 may rotate, which may cause the port 447 to rotate. In such an example, the lubricant well 327 may be of a sufficient radius (e.g., and span) such that the port 447 is in fluid communication with the lubricant well 327, for example, to supply lubricant to the rolling elements 445. As an example, the port 447 may be set in an annular groove of the outer race 444, which may optionally span 360 degrees about the outer race 444. As an example, various features may provide for supply of lubricant to rolling elements.

Figures 6A, 6B, 6C:
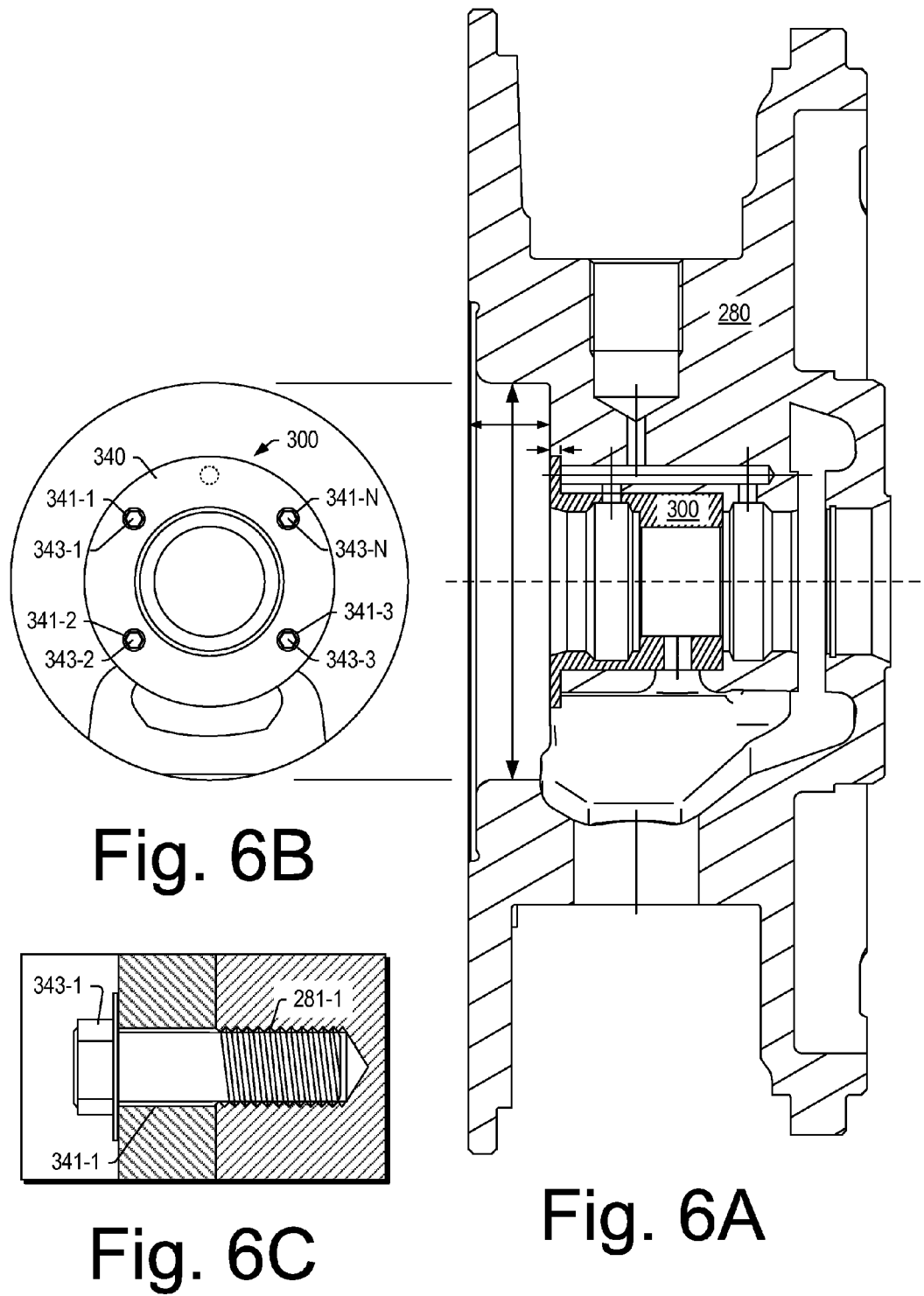
FIGS. 6A, 6B and 6C show views of the sleeve of FIG. 5 as received by an example of a turbocharger center housing.

FIGS. 6A, 6B and 6C show various views of an example of the sleeve 300 with respect to an example of the housing 280. As shown, the housing 280 can include a compressor side recess, which may include another recess that can seat the flange 310 of the sleeve 300. As an example, the flange 310 may include one or more openings 341-1, 341-2, 341-3 to 341-N that may receive one or more respective bolts 343-1, 343-2, 343-3 to 343-N, for example, via one or more respective openings 281-1 in the housing 280. For example, FIG. 6C shows the bolt 343-1 as passing in part through the opening 341-1 and being threaded into threads of the opening 281-1 of the housing 280.

As an example, a sleeve may be operatively coupled to a housing (e.g., directly and/or indirectly) via one or more mechanisms. For example, consider a sleeve that is interference fit to a housing, a sleeve that is bolted to a housing or a sleeve that is interference fit to a housing and bolted to the housing. As an example, a sleeve may be maintained in a position and/or limited in motion via one or more pins and/or one or more retaining rings. As a sleeve can include a spacer portion, which may receive axial thrust forces, a coupling mechanism or mechanisms may be selected to assure that the sleeve does not translate axially responsive to such axial thrust forces. As an example, a sleeve may be azimuthally located with respect to a housing such that the sleeve does not rotate or is limited to an amount of rotation. As an example, a sleeve may be cooled to a temperature less than a temperature of a housing and then inserted at least in part into the housing. In such an example, as the temperatures equalize, the sleeve may expand to form an interference fit to the housing. In such an example, a bolt, bolts, etc. may be used to secure the sleeve to the housing. For example, a bolt may contact, directly and/or indirectly, a flange portion of a sleeve and contact a housing to secure the sleeve to the housing.

As an example, an assembly can include a turbocharger center housing (see, e.g., the housing 280) that includes a through bore and a counterbore positioned between a compressor end and a turbine end of the through bore where the through bore includes a sleeve mating surface positioned between the compressor end and the counterbore and a turbine side bearing lubricant film formation surface positioned between the counterbore and the turbine end; and a sleeve (see, e.g., the sleeve 300) positioned at least in part in the through bore of the turbocharger center housing between the compressor end and the counterbore where the sleeve includes a locating flange and an axial extension that extends from the locating flange where the axial extension includes an outer mating surface, an inner compressor side bearing lubricant film formation surface, a compressor side axially facing spacer surface and a turbine side axially facing spacer surface.

Figure 7:
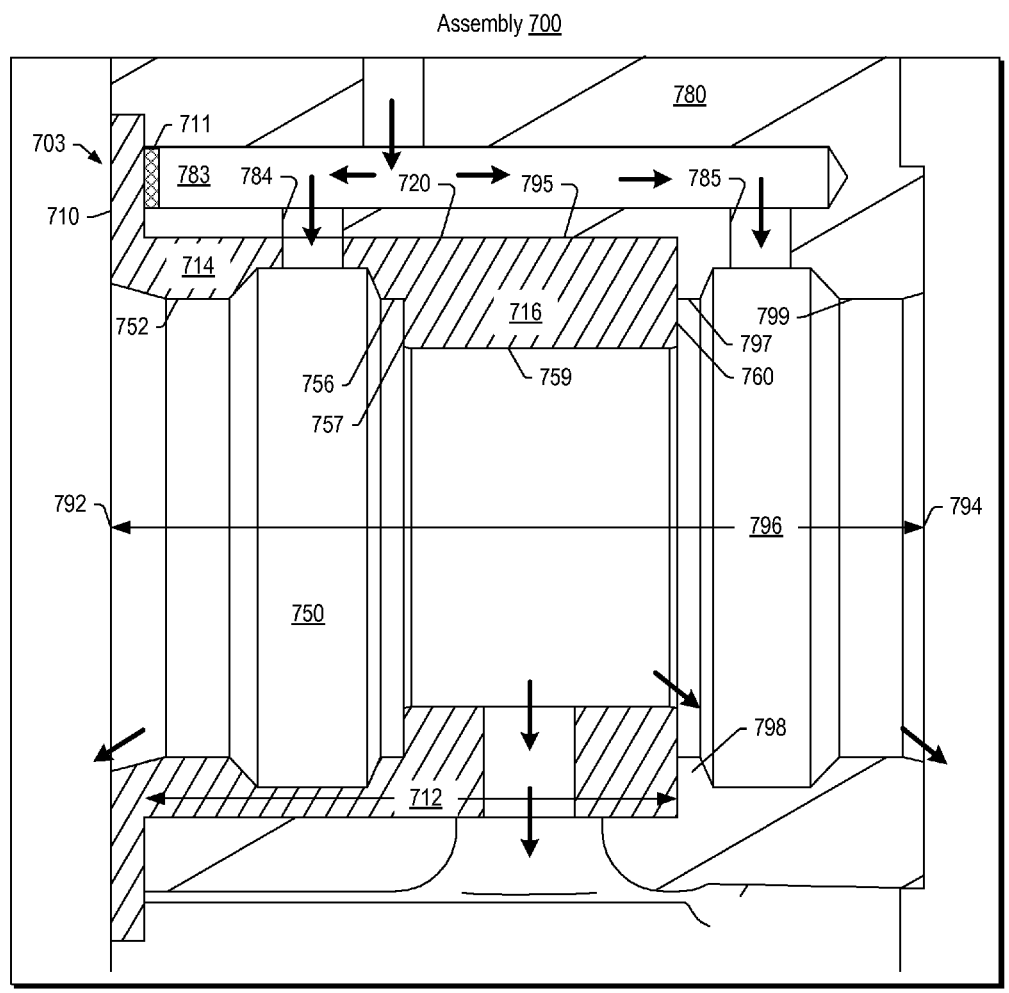
FIG. 7 shows a cutaway view of a portion of a turbocharger assembly along with arrows that indicate examples of approximate directions of lubricant flow.

FIG. 7 shows a cutaway view of a portion of an example of a turbocharger assembly 700 such as the turbocharger assembly 200 of FIG. 2 along with arrows that illustrate examples of approximate directions of lubricant flow.

In the example of FIG. 7, the assembly 700 can include a turbocharger center housing 780 that includes a through bore 796 and a counterbore 798 positioned between a compressor end 792 and a turbine end 794 of the through bore 796 where the through bore 796 includes a sleeve mating surface 795 positioned between the compressor end 792 and the counterbore 798 and a turbine side bearing lubricant film formation surface 797, 799 positioned between the counterbore 798 and the turbine end 794; and a sleeve 703 positioned at least in part in the through bore 796 of the turbocharger center housing 780 between the compressor end 792 and the counterbore 796 where the sleeve 703 includes a locating flange 710 and an axial extension 712 that extends from the locating flange 710 where the axial extension 712 includes an outer mating surface 720, an inner compressor side bearing lubricant film formation surface 752, 756, a compressor side axially facing spacer surface 757 and a turbine side axially facing spacer surface 760.

As shown in FIG. 7, the sleeve 703 includes a bore surface 750 that includes various features, including the surfaces 752, 756, 757 and 759. The bore surface 750 of the sleeve 703 can include various surfaces as labeled in FIG. 5 (see, e.g., the bore surface 350). The sleeve 703 of FIG. 7 may be defined by various dimensions such as, for example, one or more of the dimensions illustrated in FIG. 5.

In the example of FIG. 7, the flange 710 of the sleeve 703 may include or locate a seal element 711 (e.g., a plug). For example, such a seal element 711 may be positioned to seal a compressor end of a lubricant passage 783 of the housing 780. As shown, lubricant may flow to the passage 783 and to passages 784 and 785 where the passage 784 is in fluid communication with a passage of the sleeve 703 that leads to a lubricant well defined by the sleeve 703 and where the passage 785 is in fluid communication with a lubricant well defined by the housing 780. For example, the passage 784 may be axially to one side of the counterbore 798 and the passage 785 may be axially to another side of the counterbore 798. As an example, a passage of a housing may include an opening, a recess, a groove, etc. that can receive at least in part a seal element such as an O-ring. In such an example, a portion of a sleeve may cover the seal element to seal the passage of the housing (e.g., to seal from leakage radially outwardly therefrom, to seal axially, etc.).

Figure 8A:
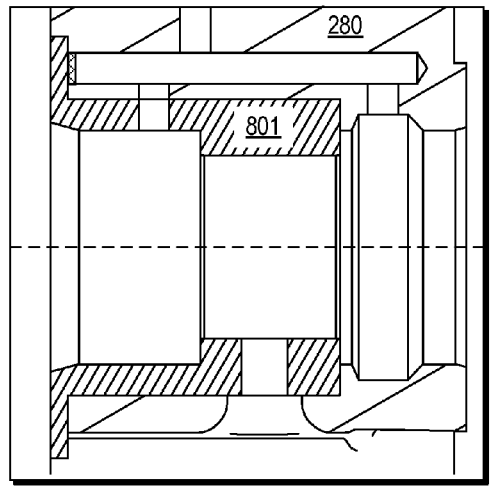
FIGS. 8A, 8B, 8C and 8D show views of examples of assemblies.
Figure 8B:
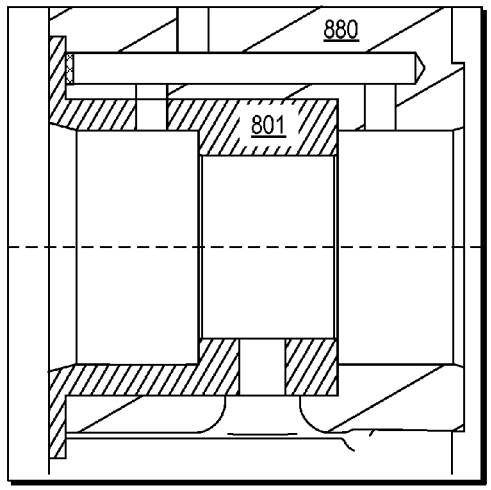
Figure 8C:
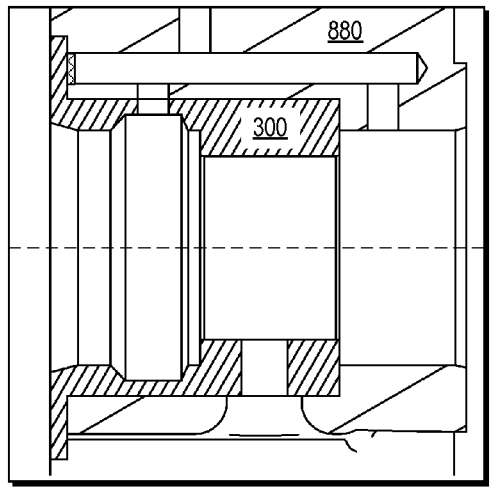
Figure 8D:
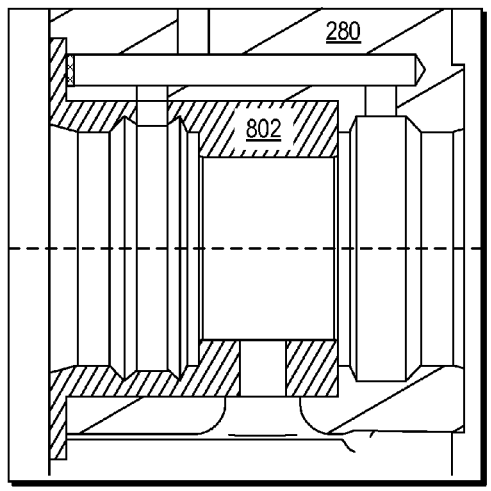

FIGS. 8A, 8B, 8C and 8D show various example assemblies that include a housing 280 or 880 and a sleeve 300, 801 or 802. In the example of FIG. 8A, a profile of the sleeve 801 differs from a profile of the housing 280 such that a squeeze film of an outer race of a compressor side bearing may differ from a squeeze film of an outer race of a turbine side bearing. In the example of FIG. 8B, a profile of the sleeve 801 has similar characteristics as a profile of the housing 880 such that a squeeze film of an outer race of a compressor side bearing may have similar characteristics as a squeeze film of an outer race of a turbine side bearing. In the example of FIG. 8C, a profile of the sleeve 300 differs from a profile of the housing 880 such that a squeeze film of an outer race of a compressor side bearing may differ from a squeeze film of an outer race of a turbine side bearing. In the example of FIG. 8D, a profile of the sleeve 802 differs from a profile of the housing 280 such that a squeeze film of an outer race of a compressor side bearing may differ from a squeeze film of an outer race of a turbine side bearing.

Figure 9A:
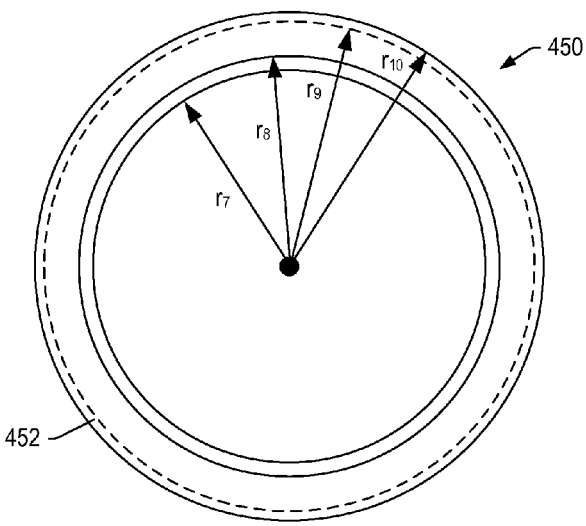
FIGS. 9A, 9B, 9C and 9D show views of an example of a spring of a spring assembly.
Figure 9C:
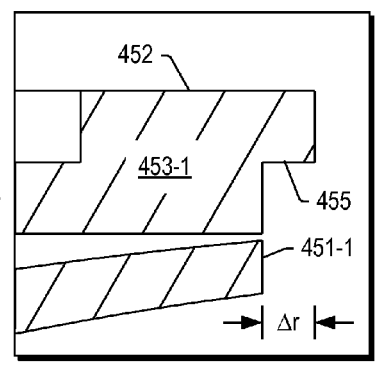
Figure 9B:
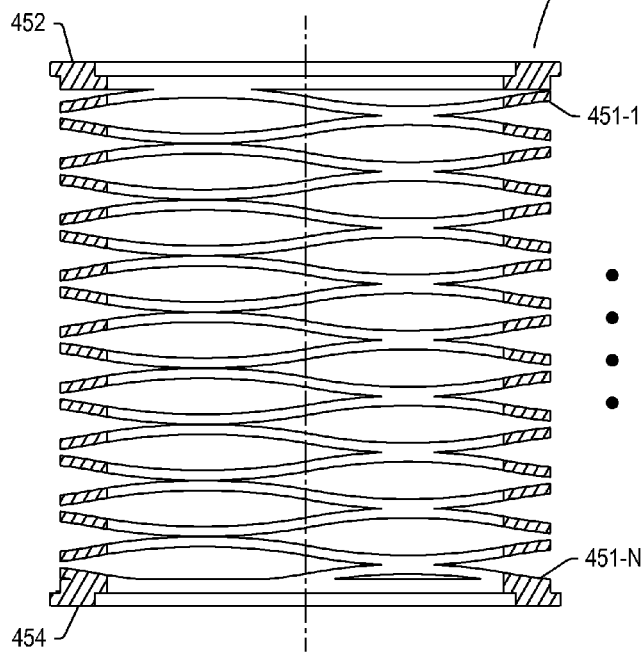
Figure 9D:
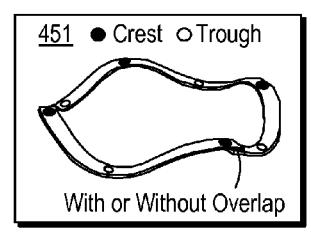

FIGS. 9A, 9B, 9C and 9D show an example of the spring 450. As shown, the spring 450 can include opposing axial facing surfaces 452 and 454 and a number of elements 451-1 to 451-N disposed therebetween. For example, the spring 450 is shown in FIG. 9B as including about 18 elements. FIG. 9D shows an example of an element 451, which may include crests and troughs (e.g., undulations) and be formed as a continuous element, for example, with or without overlapping ends. As shown in FIG. 9A, the spring 450 may be defined in part by various radii $r_7$, $r_8$, $r_9$, and $r_{10}$. As shown in FIG. 9C, the axial facing surface 452 has a radius $r_{10}$ (e.g., or diameter) that exceeds that of an element 451-1 (see, e.g., $r_9$). As shown in FIG. 9C, the axial facing surface 452 is substantially planar and part of an end feature 453-1 of the spring 450 where the end feature 453-1 includes an annular shoulder 455. As an example, the end feature 453-1 may be elastically deformable such that it can be seated within and end cap such as the end cap 430-1 or 430-2 of FIG. 3. The resiliency of the end feature 453-1 may act to biasably secure the spring 450 with respect to the end cap 430-1 or 430-2, for example, such that the spring 450 does not disengage from the end cap 430-1 or 430-2 during operation of a turbocharger.

Figure 10A:
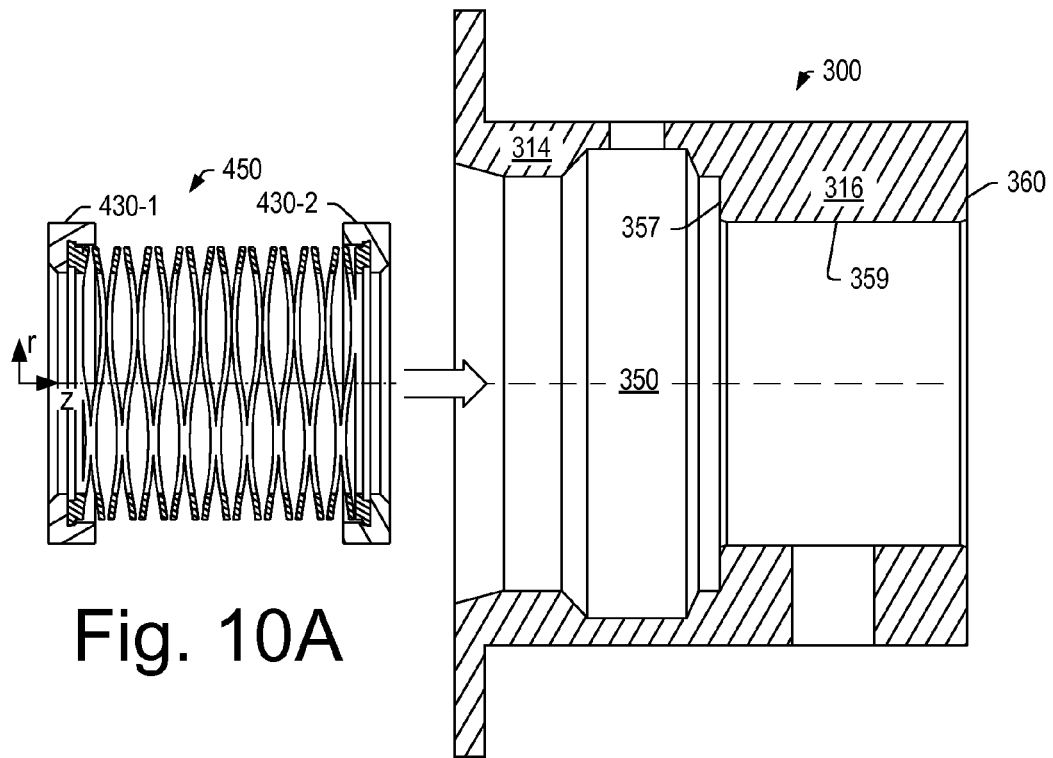
FIGS. 10A and 10B show views of an example of a spring and spacer assembly.
Figure 10B:
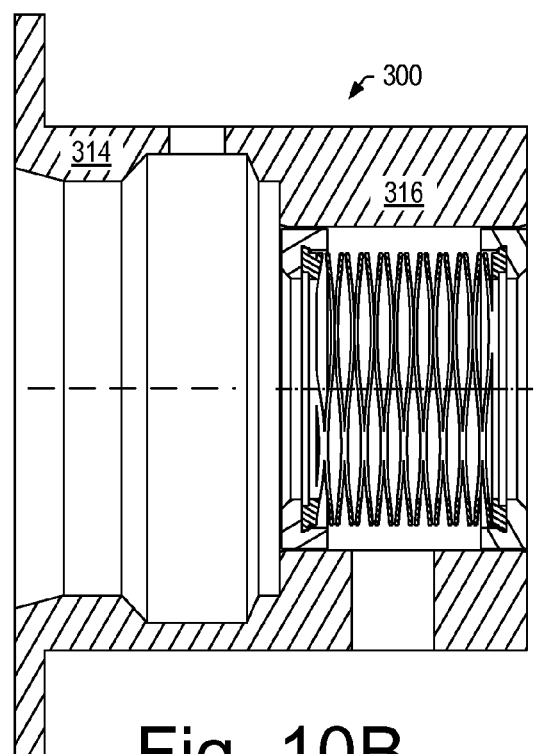

FIGS. 10A and 10B show the end caps 430-1 and 430-2 and the spring 450 (e.g., as a subassembly) with respect to the sleeve 300. As shown, the spacer portion 316 of the sleeve 300 includes the opposing axial facing surfaces 357 and 360 and the surface 359. FIG. 10A shows the spring 450 in an uncompressed state and FIG. 10B shows the spring 450 in a compressed state. In moving between these states, the end caps 430-1 and 430-2 can be located via the surface 359 of the spacer portion 316 of the sleeve 300. In such a manner, the spring 450, itself, does not directly contact the spacer portion 316. As an example, a lubricant film may form between the outer surfaces of the end caps 430-1 and 430-2 and the surface 359 of the spacer portion 316 of the sleeve 300. In such a manner, friction may be reduced such that the spring 450 operates with lesser resistance from the presence of the spacer portion 316.

Figure 11:
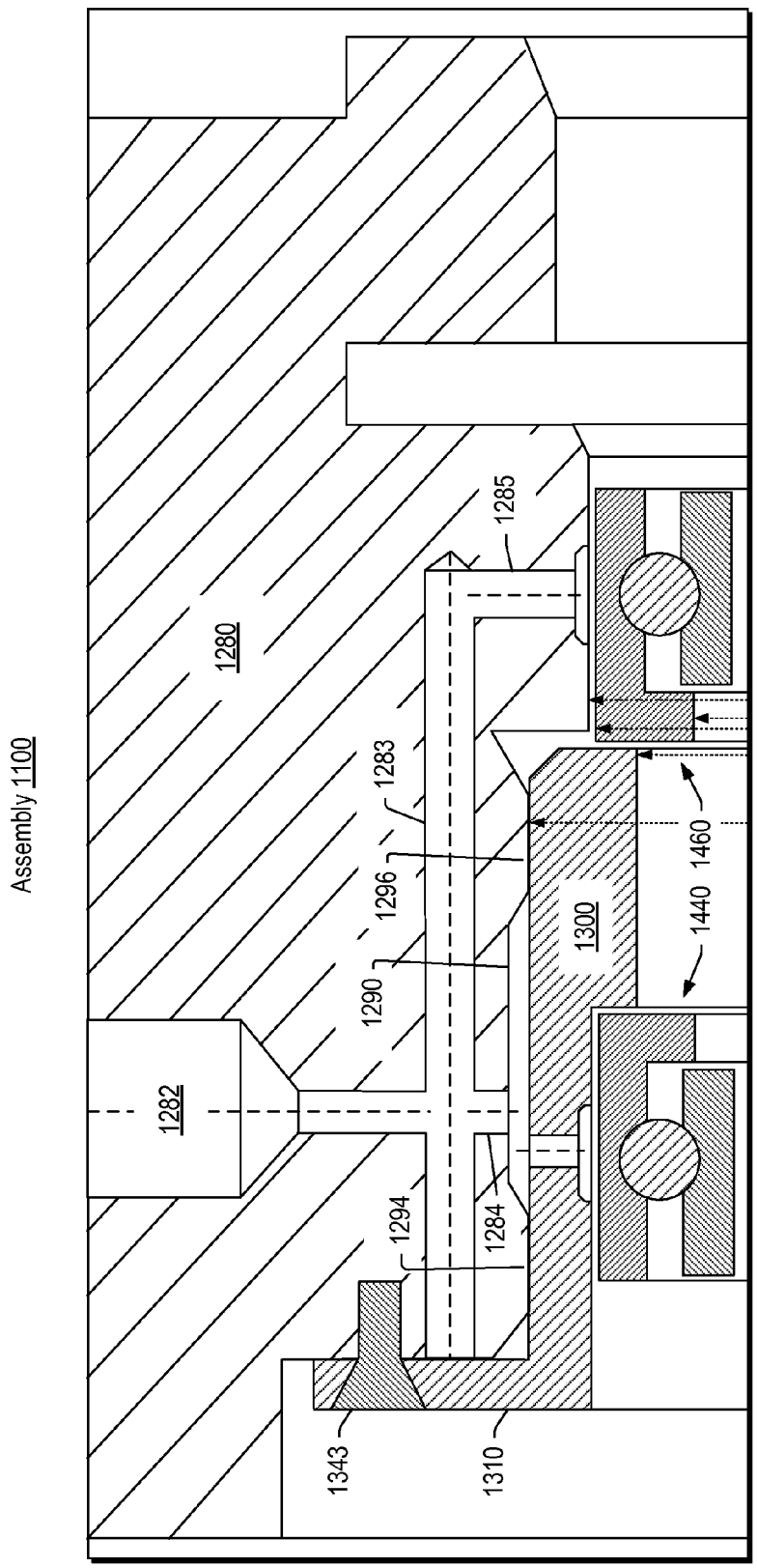
FIG. 11 shows a cutaway view of a portion of an example of a turbocharger assembly.

FIG. 11 show views of a portion of an example of a turbocharger assembly 1100. As shown, the assembly 1100 includes a housing 1280 that includes a lubricant inlet 1282 and lubricant passages 1283, 1284 and 1285. As shown, a sleeve 1300 is disposed at least partially in a bore of the housing 1280 where the sleeve 1300 at least in part locates a compressor side bearing 1440 and a turbine side bearing 1460. In the example of FIG. 11, the housing 1280 includes a lubricant well 1290 disposed between first surface 1294 and a second surface 1296. As an example, lubricant may flow from the passage 1284 to the lubricant well 1290, which may be an annular well (e.g., or semi-annular) disposed about an outer surface of the sleeve 1300. Such a well may provide for lubricant flow that can help to remove heat energy during operation and/or after operation of a turbocharger. As shown, the well 1290 may be in fluid communication with an opening (e.g., port, etc.) of the sleeve 1300, which may provide for flow of lubricant via a port or ports of an outer race of the compressor side bearing 1440 to lubricate rolling elements thereof.

As an example, the surfaces 1294 and 1296 may be sleeve locating surfaces that act to locate the sleeve 1300 with respect to the housing 1280. As an example, an interference fit may be achieved between an outer surface of the sleeve 1300 and the surfaces 1294 and 1296. As shown in the example of FIG. 11, a locating component 1343 (e.g., a bolt, etc.) may act to locate the sleeve 1300 with respect to the housing 1280. Such a component may help to avoid movement of the sleeve 1300 when subject to axial thrust forces during turbocharger operation. For example, the sleeve 1300 can include a spacer portion that acts to axially space the bearings 1440 and 1460. Thrust forces carried by one or both of the bearings 1440 and 1460 may be transferred to the sleeve 1300. In such an example, the component 1343 may secure the sleeve 1300 to the housing 1280 to avoid movement of the sleeve 1300 responsive to the thrust forces.

As an example, the sleeve 1300 may be slightly press-fit in the housing 1280 via the surfaces 1294 and 1296, which may act as two radial locating pads (e.g., to radially locate the sleeve 1300 in the housing 1280). As an example, the sleeve 1300 may be axially located via a flange 1310 that may abut against a compressor side surface of the housing 1280. Such an arrangement may act to axially located an axially facing turbine side surface of the sleeve 1300, for example, that may act to locate a turbine side bearing (see, e.g., the turbine side bearing 1460). As shown, the component 1343, which may be, for example, a bolt, may act to secure the sleeve 1300 with respect to the housing 1280.

As shown in the example of FIG. 11, the housing 1280 can include a stepped bore (e.g., a counterbore), which may, for example, provide for forming one or more mating surfaces 1294 and 1296 (e.g., pads that can radially locate the sleeve 1300) that can mate an outer surface of the sleeve 1300. As an example, the sleeve 1300 may include an annular groove that can form a lubricant well. For example, consider a 360 degree radial groove that may be formed into the sleeve. Another groove may be formed in the housing 1280, for example, to provide for flow of lubricant to the turbine side bearing 1460. As an example, the sleeve 1300 may include one or more lubricant openings. For example, consider a drilled hole that extends radially outwardly from a groove of the sleeve 1300.

As an example, one or more grooves may be crescent shaped (e.g., half-moon) where a groove may be defined by a groove depth, a groove width and a groove axial span.

As shown in the example of FIG. 11, the housing 1280 can include various passages that form a lubricant gallery. As an example, one or more of such passages may be machined into the housing 1280 before insertion of the sleeve 1300.

As an example, a turbocharger may include surfaces that define clearances for formation of one or more lubricant squeeze films (e.g., lubricant films that can act as squeeze films). For example, in FIG. 11, a squeeze film may be formed between the compressor side bearing 1440 and the sleeve 1300 and another squeeze film may be formed between the turbine side bearing 1460 and the sleeve 1300. As an example, a radial squeeze film may be created between a compressor side rolling element bearing and a sleeve and/or between a turbine side rolling element bearing and a center housing.

As an example, the assembly 1100 of FIG. 11 may be assembled in a manner where the sleeve 1300 does not rely on an interference fit to secure its axial position in the housing 1280. For example, the component 1343 may secure the axial position of the sleeve 1300 with respect to the housing 1280. As an example, machining criteria with respect to support of a compressor side bearing may be transferred to a sleeve; rather than being borne by a housing.

As an example, an assembly can include a turbocharger center housing (see, e.g., the housing 1280) that includes a through bore and a counterbore positioned between a compressor end and a turbine end of the through bore where the through bore includes a sleeve mating surface (e.g. or surfaces such as pads) positioned between the compressor end and the counterbore and a turbine side bearing lubricant film surface positioned between the counterbore and the turbine end; and a sleeve (see, e.g., the sleeve 1300) positioned at least in part in the through bore of the turbocharger center housing between the compressor end and the counterbore where the sleeve includes a locating flange and an axial extension that extends from the locating flange where the axial extension includes an outer mating surface, an inner compressor side bearing surface, a compressor side axially facing spacer surface and a turbine side axially facing spacer surface.

FIGS. 12A to 12K shows examples of housings 1580 and 1582, examples of sleeves 1532, 1534 and 1536 and examples of housing and sleeve assemblies. As shown in FIG. 12A, the housing 1580 can include a radial groove that spans 360 degrees. As shown in FIG. 12B, the housing 1582 can include a groove that has a crescent shape, which spans an angle less than about 360 degrees; noting that a groove may span about 360 degrees and be eccentric with respect to a sleeve mating surface disposed at a diameter (e.g., consider a groove axis being offset from a central axis of a sleeve mating surface). In the examples of FIGS. 12A and 12B, the cross-sectional views of the housings 1580 and 1582 may be for a compressor side and/or for a turbine side.

As shown in FIG. 12C, the sleeve 1532 can include an exterior radial groove and an interior radial groove and at least one passage such that the exterior radial groove and the interior radial groove are in fluid communication (e.g., for passage of lubricant). As shown in FIG. 12D, the sleeve 1534 can include an exterior groove that has a crescent shape, which spans an angle less than about 360 degrees; noting that a groove may span about 360 degrees and be eccentric with respect to a compressor side bearing lubricant film formation surface disposed at a diameter (e.g., consider a groove axis being offset from a central axis of a compressor side bearing lubricant film formation surface axis). As shown in FIG. 12E, the sleeve 1536 can include an interior groove that has a crescent shape, as well as an exterior groove, which may have a crescent shape (e.g., or another shape).

FIGS. 12F to 12K show various examples of the housings 1580 and 1582 with respect to the sleeves 1532, 1534 and 1536. As an example, one or more of the example assemblies described herein may include one or more of the features of the housings 1580 and 1582 and/or the sleeves 1532, 1534 and 1536 of FIGS. 12A to 12K. Such features include lubricant distribution features, for example, to distribute lubricant to a sleeve and/or, for the housings 1580 and 1582, for example, to distribute lubricant to a turbine side bearing.

As an example, a groove may be defined by a radius, a diameter or radii; by an axial dimension or axial dimensions; and by an azimuthal span or azimuthal spans.

Figure 13:
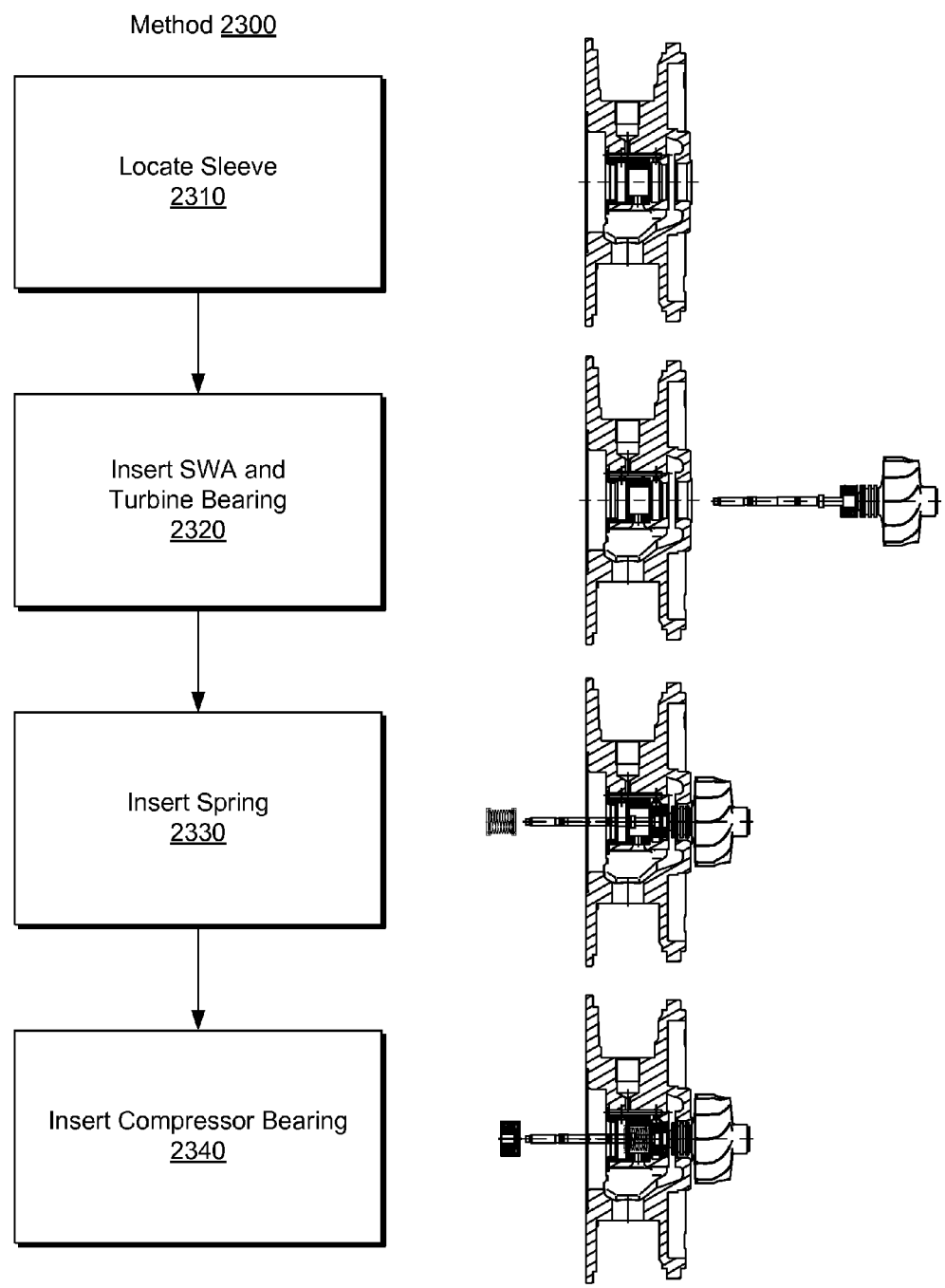
FIG. 13 shows a block diagram of an example of a method.

FIG. 13 shows an example of a method 2300 along with examples of equipment that may be assembled according to the method 2300. As shown, the method 2300 includes a location block 2310 for locating a sleeve with respect to a housing, an insertion block 2320 for inserting a shaft and turbine wheel assembly (SWA) and a turbine side bearing with respect to the sleeve and housing, an insertion block 2330 for inserting a spring with respect to a spacer portion of the sleeve, and an insertion block 2340 for inserting a compressor side bearing with respect to the sleeve and the spring. As indicated, the sleeve is located (e.g., inserted) into the housing via a compressor side, the SWA and turbine bearing are inserted into the housing via a turbine side, the spring is inserted into the housing via the compressor side and the compressor side bearing is inserted into the housing via the compressor side.

Figure 14:
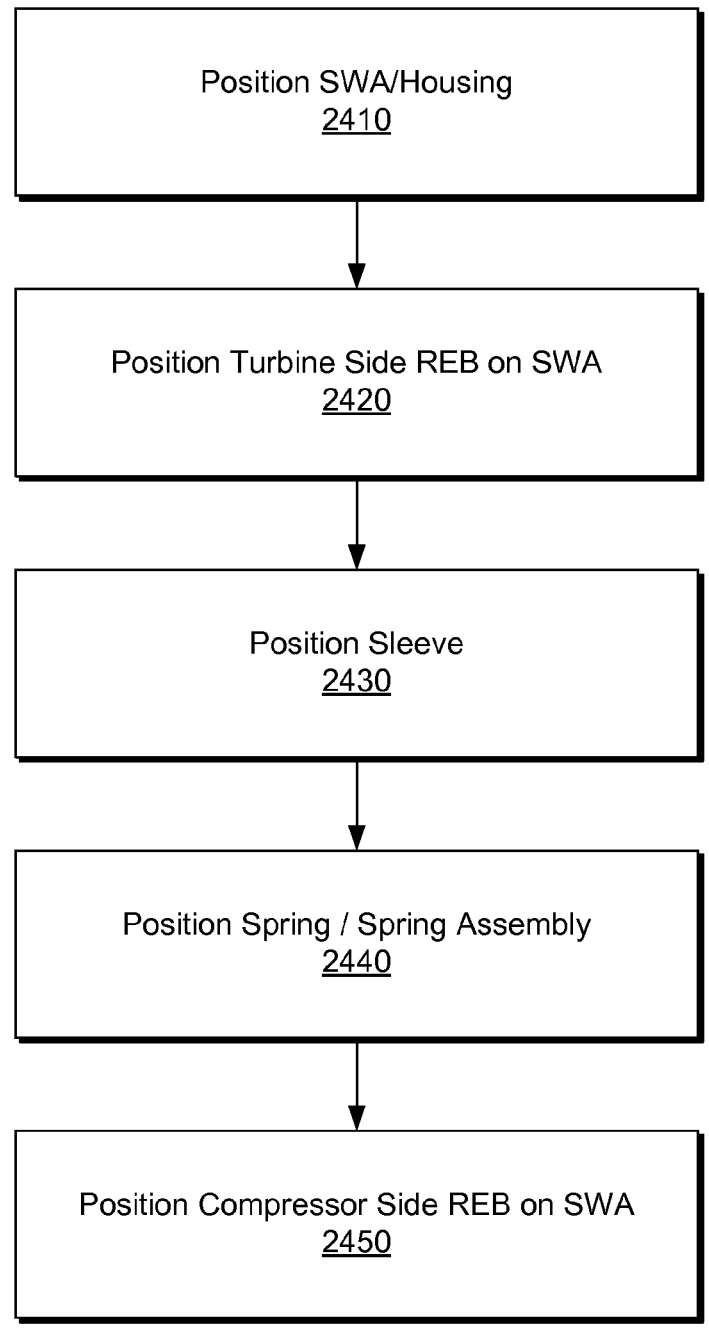
FIG. 14 shows a block diagram of an example of a method.

FIG. 14 shows an example of a method 2400. As shown, the method 2300 includes a position block 2410 for positioning a SWA in a center housing, a position block 2420 for positioning a turbine side rolling element bearing on the SWA (e.g., via a compressor side of the center housing), a position block 2430 for positioning a sleeve in the center housing (e.g., optionally adding one or more components such as, for example, one or more bolts, pins, rings, etc.), a position block 2440 for positioning a spring assembly in the sleeve and a position block 2450 for positioning a compressor side rolling element bearing on the SWA (e.g., and at least in part in the sleeve).

As an example, an assembly can include a turbocharger center housing that includes a through bore and a counterbore positioned between a compressor end and a turbine end of the through bore where the through bore includes a sleeve mating surface positioned between the compressor end and the counterbore and a turbine side bearing lubricant film formation surface positioned between the counterbore and the turbine end; and a sleeve positioned at least in part in the through bore of the turbocharger center housing between the compressor end and the counterbore where the sleeve includes a locating flange and an axial extension that extends from the locating flange where the axial extension includes an outer mating surface, an inner compressor side bearing lubricant film formation surface, a compressor side axially facing spacer surface and a turbine side axially facing spacer surface. Such an assembly can include a compressor side bearing that includes an outer race and rolling elements where the outer race is received at least in part by the sleeve to form a lubricant film clearance between the outer race and the inner compressor side bearing lubricant film formation surface of the sleeve and can include a turbine side bearing that is received at least in part by the through bore to form a lubricant film clearance between the turbine side bearing and the turbine side bearing lubricant film formation surface of the through bore of the turbocharger center housing.

As an example, an assembly can include a shaft and turbine wheel assembly (SWA) where a turbine side bearing is fit to the shaft.

As an example, an assembly can include a spring positioned at least in part between a compressor side axially facing spacer surface and a turbine side axially facing spacer surface of a sleeve.

As an example, an assembly can include at least one bolt that bolts a sleeve to a turbocharger housing (e.g., a turbocharger center housing). As an example, an assembly can include a bolt that contacts a locating flange of a sleeve and that contacts a housing to secure the sleeve to the housing.

As an example, an assembly can include a housing that includes a sleeve mating surface of a through bore of the housing and a sleeve that includes an outer mating surface that can radially position the sleeve in the through bore of the housing via contact with the sleeve mating surface.

As an example, an assembly can include a housing that includes lubricant passages that direct lubricant to a first lubricant opening disposed between a compressor end and a counterbore of a housing and to a second lubricant opening disposed between the counterbore and a turbine end of the housing. For example, a counterbore may be disposed axially in a through bore of a housing between a compressor side lubricant opening of the through bore and a turbine side lubricant opening of the through bore.

As an example, an assembly can include a housing that includes a through bore with a sleeve mating surface where the sleeve mating surface is a first sleeve mating surface and where the housing further includes a second sleeve mating surface. In such an example, the housing can include lubricant well surfaces disposed between the first sleeve mating surface and the second sleeve mating surface.

As an example, an assembly can include a compressor side bearing, a turbine side bearing, a shaft and a turbine wheel where the turbine wheel is welded to the shaft and the shaft rotatably supported by the compressor side bearing and the turbine side bearing. Such an assembly may also include a compressor wheel attached to the shaft (e.g., consider a compressor wheel with a through bore, a receptacle, etc.).

As an example, an assembly can include a compressor side bearing that includes an outer race, rolling elements and an inner race where the outer race is received at least in part by a sleeve disposed at least in part in a through bore of a housing to form a lubricant film clearance with respect to a compressor side bearing lubricant film formation surface of the sleeve and such an assembly can include a turbine side bearing that includes an outer race, rolling elements and an inner race where the outer race is received at least part between a counterbore and a turbine end of the through bore of the housing where the outer race is axially located at least in part by an turbine side axially facing spacer surface of the sleeve and where the outer race of the turbine side bearing forms a lubricant film clearance with respect to a turbine side lubricant film formation surface of the through bore of the housing where the turbine side lubricant film formation surface is disposed between the counterbore and the turbine end of the through bore. In such an example, lubricant can be supplied to the housing to form lubricant films (e.g., squeeze films) in the lubricant film clearances.

As an example, a turbocharger shaft can include a turbine wheel; a first portion that includes a turbine side rolling element bearing inner race interference fit surface disposed at a first outer diameter; a second portion that includes a compressor side rolling element bearing inner race interference fit surface disposed at a second outer diameter; a third portion that includes a compressor side rolling element bearing inner race axial locating surface that extends radially to a third outer diameter; and a fourth portion disposed axially between the first portion and the third portion where the fourth portion includes a fourth outer diameter where the fourth outer diameter is less than the first outer diameter and less than the third outer diameter. In such an example, the first portion can include a first axial length and the third portion can include a third axial length that is less than the first axial length and, for example, the fourth portion can include a fourth axial length that exceeds the first axial length.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
   a turbocharger center housing that comprises a through bore and a counterbore positioned between a compressor end and a turbine end of the through bore wherein the through bore comprises a sleeve mating surface positioned between the compressor end and the counterbore and a turbine side bearing lubricant film formation surface positioned between the counterbore and the turbine end;
   a turbine side bearing that is received at least in part between the counterbore and the turbine end to define a lubricant film clearance wherein the lubricant film clearance is defined by the difference between an outer radius of an outer surface of an outer race of the turbine side bearing and an inner radius of the turbine side bearing lubricant film formation surface of the through bore of the turbocharger center housing; and
   a sleeve positioned at least in part in the through bore of the turbocharger center housing between the compressor end and the counterbore wherein the sleeve comprises a locating flange and an axial extension that extends from the locating flange wherein the axial extension comprises an outer mating surface that contacts the sleeve mating surface of the turbocharger center housing, an inner compressor side bearing lubricant film formation surface, a compressor side axially facing spacer surface and a turbine side axially facing spacer surface wherein the outer race of the turbine side bearing is axially located at least in part by the turbine side axially facing spacer surface.

2. The assembly of claim 1 further comprising a compressor side bearing that comprises an outer race and rolling elements wherein the outer race is received at least in part by the sleeve to form a lubricant film clearance between the outer race and the inner compressor side bearing lubricant film formation surface of the sleeve.

3. The assembly of claim 1 further comprising a shaft and turbine wheel assembly wherein the turbine side bearing is fit to the shaft.

4. The assembly of claim 1 further comprising a spring positioned at least in part between the compressor side axially facing spacer surface and the turbine side axially facing spacer surface of the sleeve.

5. The assembly of claim 1 further comprising at least one bolt that bolts the sleeve to the housing.

6. The assembly of claim 1 further comprising a bolt that contacts the locating flange and that contacts the housing to secure the sleeve to the housing.

7. The assembly of claim 1 wherein the sleeve mating surface of the through bore of the housing and the outer mating surface of the sleeve radially position the sleeve in the through bore of the housing.

8. The assembly of claim 1 wherein the housing comprises lubricant passages that direct lubricant to a first lubricant opening disposed between the compressor end and the counterbore and to a second lubricant opening disposed between the counterbore and the turbine end.

9. The assembly of claim 1 wherein the sleeve mating surface comprises a first sleeve mating surface and further comprising a second sleeve mating surface.

10. The assembly of claim 9 further comprising lubricant well surfaces disposed between the first sleeve mating surface and the second sleeve mating surface.

11. The assembly of claim 1 further comprising a compressor side bearing, a shaft and a turbine wheel, the turbine wheel welded to the shaft and the shaft rotatably supported by the compressor side bearing and the turbine side bearing.

12. The assembly of claim 11 further comprising a compressor wheel attached to the shaft.

13. The assembly of claim 1 further comprising a compressor side bearing that comprises an outer race, rolling elements and an inner race wherein the outer race is received at least in part by the sleeve.

14. The assembly of claim 13 wherein the turbine side bearing comprises rolling elements and an inner race wherein the outer race is received at least part between the counterbore and the turbine end.

15. An assembly comprising:
   a turbocharger center housing that comprises a through bore and a counterbore positioned between a compressor end and a turbine end of the through bore wherein the through bore comprises a sleeve mating surface positioned between the compressor end and the counterbore and a turbine side bearing lubricant film formation surface positioned between the counterbore and the turbine end;
   a sleeve positioned at least in part in the through bore of the turbocharger center housing between the compressor end and the counterbore wherein the sleeve comprises a locating flange and an axial extension that extends from the locating flange wherein the axial extension comprises an outer mating surface, an inner compressor side bearing lubricant film formation surface, a compressor side axially facing spacer surface and a turbine side axially facing spacer surface;
   a compressor side bearing that comprises an outer race, rolling elements and an inner race wherein the outer race is received at least in part by the sleeve; and
   a turbine side bearing that comprises an outer race, rolling elements and an inner race wherein the outer race is received at least part between the counterbore and the turbine end and wherein the outer race is axially located at least in part by the turbine side axially facing spacer surface of the sleeve.

* * * * *